Figure 1:
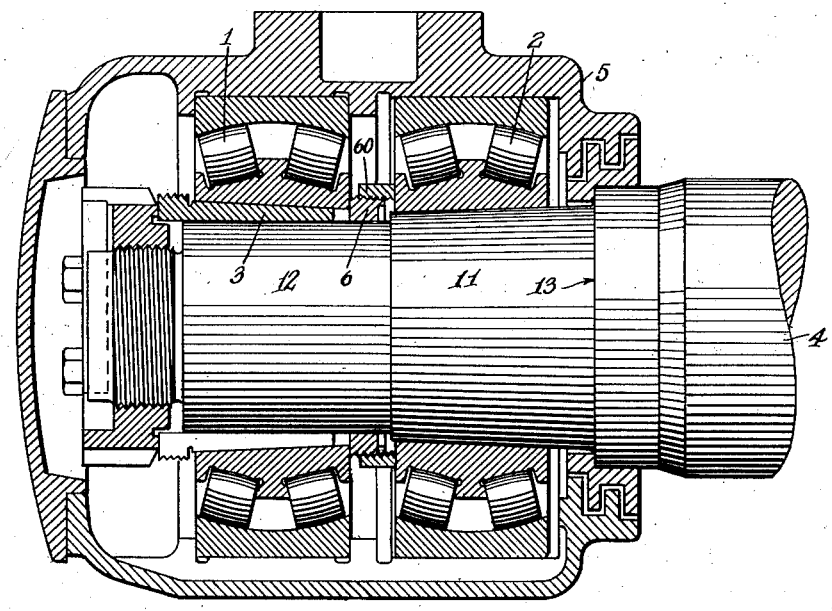

April 3, 1934.  W. LENZ  1,953,811
ANTIFRICTION BEARING AXLE BOX
Filed July 29, 1932

INVENTOR
WILHELM LENZ
BY
HIS ATTORNEY

Patented Apr. 3, 1934

1,953,811

UNITED STATES PATENT OFFICE 1,953,811

ANTIFRICTION BEARING AXLE BOX

Wilhelm Lenz, Schweinfurt, Germany, assignor to Aktiebolaget Svenska Kullagerfabriken, Gottenborg, Sweden, a corporation of Sweden Application July 29, 1932, Serial No. 626,141
In Germany July 30, 1931

1 Claim. (Cl. 308—236)

In order to facilitate the mounting of the bearings in anti-friction bearing axle boxes having two anti-friction bearings the inner rings of the bearings are usually mounted on the axle by means of taper sleeves. When mounting the taper sleeve in the inner bearing the inner ring of the bearing abuts against the shoulder of the axle. This bearing is of selfcontained type, and its outer ring is axially fixed relative to the box, thereby axially locating the box in correct position. The outer bearing is a free bearing, i. e. either its outer race is mounted axially floating in the box or the bearing is made internally axially floating. This bearing cannot be used as a locating bearing, since its inner ring abuts against the taper sleeve of the inner bearing. This taper sleeve does not, however, in each case always assume the same position on the axle, since the position will depend on the exactness of the taper and dimensions of the sleeve and of the bore of the bearing. Since the outer bearing abuts against the sleeve of the inner bearing as above mentioned, the definite position which it will assume when in place on the axle cannot be precisely predetermined.

The inner bearing may be mounted directly on the axle without the use of an intermediate taper sleeve, in which case the tapered bore of the inner ring of the bearing directly engages an outwardly tapered portion of the journal. In this manner it is possible to greatly strengthen the journal, but the inner bearing can no longer serve to locate the axle box, since its position on the tapered portion of the journal cannot be definitely predetermined. If the inner ring of the outer bearing abuts against the inner ring of the inner bearing without a suitable intermediate sleeve, the outer bearing cannot be used for locating the axle box since its position will depend on that taken up by the inner bearing and will, therefore, be indefinite.

The purpose of the present invention is to provide an axle box of the type described above, in which the outer bearing can serve to locate the axle box. According to the invention a distance sleeve is interposed between the inner rings of the bearings, this sleeve being of such a width that the required distance between the centre of the axle box and the journal shoulder will always be obtained independently of the location of the inner bearing. The width of the distance sleeve is fixed after measuring the distance between the face of the shoulder and the inner face of the mounted inner bearing. The distance sleeve can, however, also be so formed that its width is variable, for example by threading the outer circumference of the sleeve to engage threads on a surrounding circular sleeve.

Figure 2:
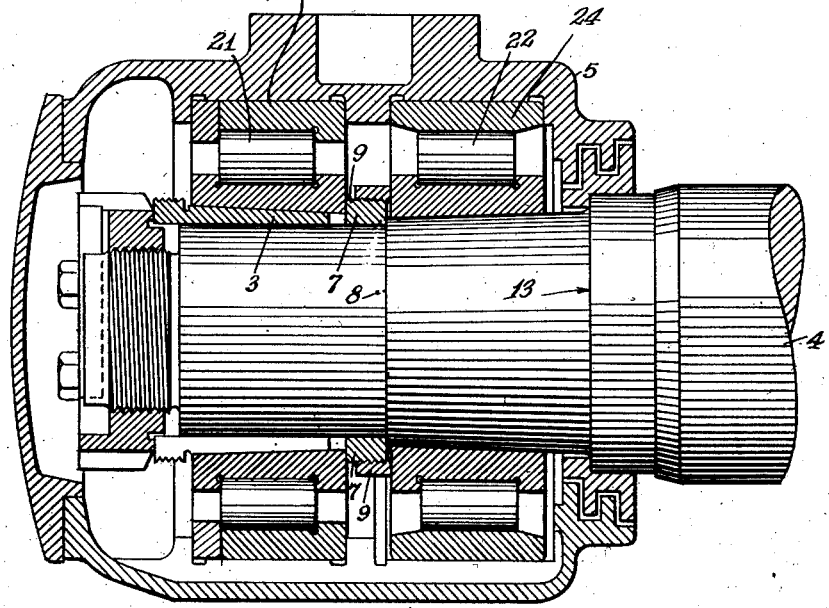

In the drawing accompanying this specification two practicable embodiments of my invention are illustrated in which drawing:

Figure 1 shows in elevation the journal end of an axle and in vertical longitudinal section a journal box and two substantially similar self-aligning bearings mounted on the journals together with a form of distance sleeve, and Fig. 2 is a similar view showing another form of distance sleeve, mounted between two cylindrical roller bearings.

One form of the invention is illustrated in Fig. 1, in which the inner roller bearing 2, of self-aligning type, is mounted directly on the outwardly tapering part 11 of the journal 4 without the use of a taper sleeve. The outer bearing 1, also of self-aligning type, is mounted on the cylindrical outer end portion 12 of the journal by means of a taper sleeve 3. The outer ring of the bearing 2 is in this case mounted axially free within the axle box 5, while that of the bearing 1 is fixed. The axle box is thus positioned by the bearing 1. The figure shows a form of the invention in which a distance sleeve 10 is interposed between the inner rings of the bearings, this sleeve being of such a width that the distance between the centre of the axle box 5 and the journal shoulder 13 will in all cases be very nearly the same. It is therefore necessary after mounting the bearing 2 on the journal to determine its distance to a certain reference shoulder as 8 on the journal and dimension the width of the distance sleeve accordingly.

The upper half of Fig. 1 illustrates a similar axle box, the only difference being that the width of the distance sleeve is variable, it being formed of two parts 6 and 60 in screw threaded relation. After having measured the distance between the mounted bearing 2 and the reference shoulder as described above it is, therefore, possible to adjust the position of the outer bearing 1 with respect to the reference shoulder on the axle journal.

Fig. 2 illustrates a form of the invention in which the sleeve 7 engages the shoulder 8. The required distance of the bearing 1 from a reference shoulder on the journal, in this case the shoulder 8, is fixed by the width of the sleeve 7. The sleeve 7 is externally threaded and is provided with an internally threaded surrounding sleeve 9 which serves to support the inner ring of the bearing 22 on the tapering part of the journal.

In the Figure 2 illustration there are shown two cylindrical roller bearings 21 and 22. The outer rings 23 and 24 of both of these bearings are mounted against free floating but owing to the construction of the outer race 23 this bearing will serve to locate the journal in relation to the axle box, the bearing 22 being of a floating construction.

Having thus described my invention, what I claim and desire to secure by Letter Patent is:

In a device of the character specified, the combination with a journal box and an axle having an outwardly tapering inboard journal portion and a cylindrical outboard journal portion, there being an outwardly facing shoulder between such portions, of two anti-friction bearings having tapering bores, the inner race of one bearing being mounted on the tapering inboard journal portion and its outer race ring being mounted in the box, the inner race ring of the other bearing being mounted on the cylindrical outboard journal portion, a taper adapter sleeve interposed between these parts, the outer race ring of this bearing being axially located in the box, an inner distance sleeve interposed between the inner ring of the outboard bearing and the aforesaid outwardly facing shoulder, and an outer distance sleeve having screw threaded connection with the inner distance sleeve and adapted to engage the outboard end of the inboard inner race ring.

WILHELM LENZ.